(12) United States Patent
Yoshioka

(10) Patent No.: US 12,088,767 B2
(45) Date of Patent: Sep. 10, 2024

(54) IMAGE FORMING APPARATUS FOR MAKING PARTICLES LESS LIKELY TO BE ATTACHED TO SUPPORT UNIT

(71) Applicant: FUJIFILM Business Innovation Corp., Tokyo (JP)

(72) Inventor: Tomoaki Yoshioka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/994,002

(22) Filed: Nov. 25, 2022

(65) Prior Publication Data
US 2023/0421710 A1    Dec. 28, 2023

(30) Foreign Application Priority Data
Jun. 28, 2022 (JP) ................................. 2022-103394

(51) Int. Cl.
*G03G 15/16* (2006.01)
*G03G 15/00* (2006.01)
(Continued)

(52) U.S. Cl.
CPC ..... *H04N 1/00559* (2013.01); *G03G 15/0136* (2013.01); *G03G 15/1625* (2013.01);
(Continued)

(58) Field of Classification Search
CPC ....... G03G 15/0136; G03G 2215/1623; G03G 15/1605; G03G 15/1625; G03G 15/165; G03G 15/1655; G03G 15/166; G03G 15/0189; G03G 15/2007; G03G 15/201; G03G 15/6529; G03G 15/6558; G03G 15/6559; G03G 15/6582;
(Continued)

(56) References Cited

U.S. PATENT DOCUMENTS 3,687,541 A * 8/1972 Aser ................. G03G 15/232
399/314
5,822,649 A * 10/1998 Karashima ........... G03G 15/168
399/101

(Continued)

FOREIGN PATENT DOCUMENTS

JP  3292954  6/2002
JP  6900650  7/2021

OTHER PUBLICATIONS

"Search Report of Europe Counterpart Application", issued on Nov. 6, 2023, p. 1-p. 7.

*Primary Examiner* — Arlene Heredia
*Assistant Examiner* — Laura Roth
(74) *Attorney, Agent, or Firm* — JCIPRNET

(57) ABSTRACT

An image forming apparatus includes a transport unit, a transfer unit and a support unit. The transport unit transports a recording medium. The transfer unit transfers an image formed with particles onto an image formation surface of the recording medium transported by the transport unit by an electric field formed between the transfer unit and the image formation surface by making contact with the image formation surface. The support unit supports the recording medium, is transported to the transfer unit together with the recording medium by the transport unit, and is not directly conductive with the transfer unit.

8 Claims, 10 Drawing Sheets

(51) Int. Cl.
  *G03G 15/01* (2006.01)
  *H04N 1/00* (2006.01)
  *G03G 15/20* (2006.01)

(52) U.S. Cl.
  CPC ......... *G03G 15/165* (2013.01); *G03G 15/166* (2013.01); *G03G 15/6529* (2013.01); *G03G 15/201* (2013.01); *G03G 2215/00371* (2013.01); *G03G 2215/00379* (2013.01); *G03G 2215/00523* (2013.01); *G03G 2215/00708* (2013.01); *G03G 2215/00919* (2013.01); *G03G 2215/1623* (2013.01); *H04N 2201/00* (2013.01)

(58) Field of Classification Search
  CPC .......... G03G 2215/00371; G03G 2215/00379; G03G 2215/00409; G03G 2215/00523; G03G 2215/00561; G03G 2215/00679; G03G 2215/00708; G03G 2215/00919; H04N 2201/00; H04N 1/00559
  See application file for complete search history.

(56) References Cited

U.S. PATENT DOCUMENTS

| | | | |
|---|---|---|---|
| 6,146,805 A | 11/2000 | Yoshimura et al. | |
| 8,718,522 B2* | 5/2014 | Chillscyzn | B29C 64/141 |
| | | | 353/121 |
| 2002/0021921 A1* | 2/2002 | Akema | G03G 15/2064 |
| | | | 399/322 |
| 2004/0240911 A1 | 12/2004 | Schultheis et al. | |

* cited by examiner

TRANSPORT DIRECTION

TRANSPORT DIRECTION

TRANSPORT DIRECTION

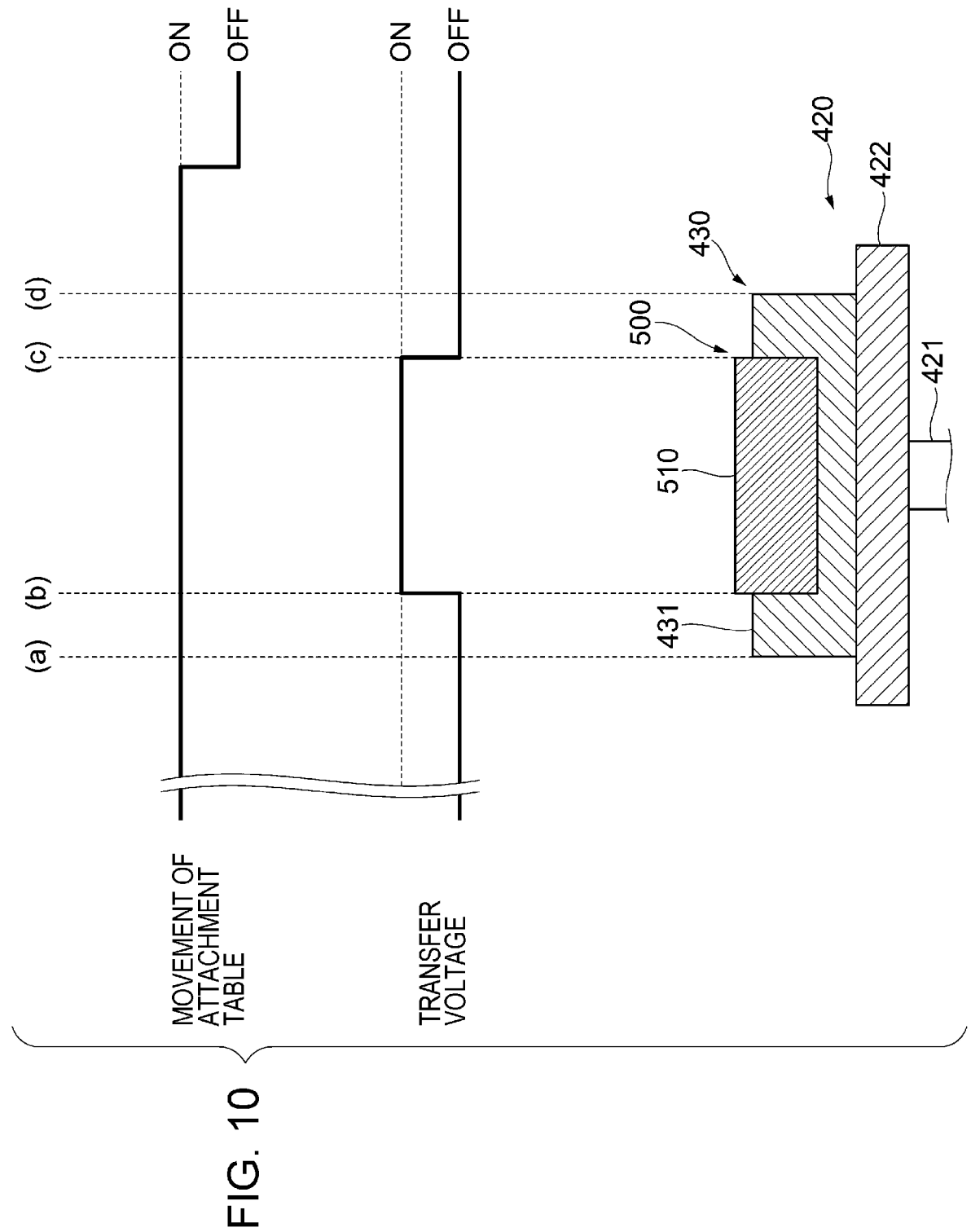

IMAGE FORMING APPARATUS FOR MAKING PARTICLES LESS LIKELY TO BE ATTACHED TO SUPPORT UNIT

CROSS-REFERENCE TO RELATED APPLICATIONS

This application is based on and claims priority under 35 USC 119 from Japanese Patent Application No. 2022-103394 filed Jun. 28, 2022.

BACKGROUND

(i) Technical Field

The present disclosure relates to an image forming apparatus.

(ii) Related Art

Japanese Patent No. 3292954 discloses a printer that forms an image on an image formation surface of a disc transported by a transport device. In this printer, a toner image given to a transfer belt is electrically transferred onto the image formation surface of the disc by bringing an electrode of a transfer device into contact with the image formation surface and supplying an electric charge.

SUMMARY

Some image forming apparatuses bring a transfer unit into contact with an image formation surface of a recording medium transported by a transport unit and thereby transfer an image formed with particles such as toner onto the recording medium. The transfer unit transfers the image formed with particles onto the recording medium by an electric field formed between the transfer unit and the recording medium.

In such an image forming apparatus, it is desirable to provide a support unit that supports a recording medium from a perspective of making misregistration of the recording medium less likely to occur due to a shock caused when the transfer unit makes contact with the recording medium. Meanwhile, in a case where the recording medium is supported by the support unit, if the support unit and the transfer unit are directly conductive with each other, particles such as toner may be undesirably attached from the transfer unit to the support unit by an electric field between the transfer unit and the support unit.

Aspects of non-limiting embodiments of the present disclosure relate to a technique of making particles less likely to be attached to a support unit that supports a recording medium than in a case where the support unit and a transfer unit are directly conductive with each other.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image forming apparatus including: a transport unit that transports a recording medium; a transfer unit that transfers an image formed with particles onto an image formation surface of the recording medium transported by the transport unit by an electric field formed between the transfer unit and the image formation surface by making contact with the image formation surface; and a support unit that supports the recording medium, is transported to the transfer unit together with the recording medium by the transport unit, and is not directly conductive with the transfer unit.

BRIEF DESCRIPTION OF THE DRAWINGS

Exemplary embodiments of the present disclosure will be described in detail based on the following figures, wherein:

FIG. 3A illustrates how the height is controlled, FIG. 3B illustrates a state where an attachment table has retreated to a preparation position after the height control, and FIG. 3C illustrates a state where the transfer unit starts transfer of an image;

FIG. 4A illustrates a state where openings of the fixing unit are closed, and FIG. 4B illustrates a state where the openings of the fixing unit are opened;

FIG. 6A illustrates an example using the jig illustrated in FIG. 5, and FIG. 6B illustrates an example using a modification of the jig;

FIG. 7A is a view of the jig and the medium viewed from an upper side, and FIG. 7B is a cross-sectional view of the jig and the medium taken along a transport direction in a central part in a width direction thereof;

FIG. 8A is a view of the jig and the medium viewed from an upper side, and FIG. 8B is a cross-sectional view of the jig and the medium taken along the transport direction at a central part in a width direction thereof;

FIG. 9A is a view of the jig and the medium viewed from an upper side, and FIG. 9B is a cross-sectional view of the jig and the medium taken along the transport direction at a central part in a width direction thereof; and FIG. 10 is a sequence diagram illustrating an example of a relationship between a timing of control by a controller and a timing at which the medium held by the jig is transported to a transfer position.

DETAILED DESCRIPTION

First Exemplary Embodiment

An exemplary embodiment of the present disclosure is described in detail below with reference to the attached drawings. An image forming apparatus according to the present exemplary embodiment is an image forming apparatus employing digital printing. Although an electrophotographic system, an inkjet system, and the like are known as digital printing systems, the electrophotographic system is assumed in the present exemplary embodiment. In the electrophotographic system, a transfer unit and a medium are brought into contact with each other when an image is transferred onto the medium. Furthermore, in the present exemplary embodiment, any of media having various thicknesses and shapes such as metal, glass, and tile is assumed as an object on which an image is to be printed.

Apparatus Configuration

Figure 1:
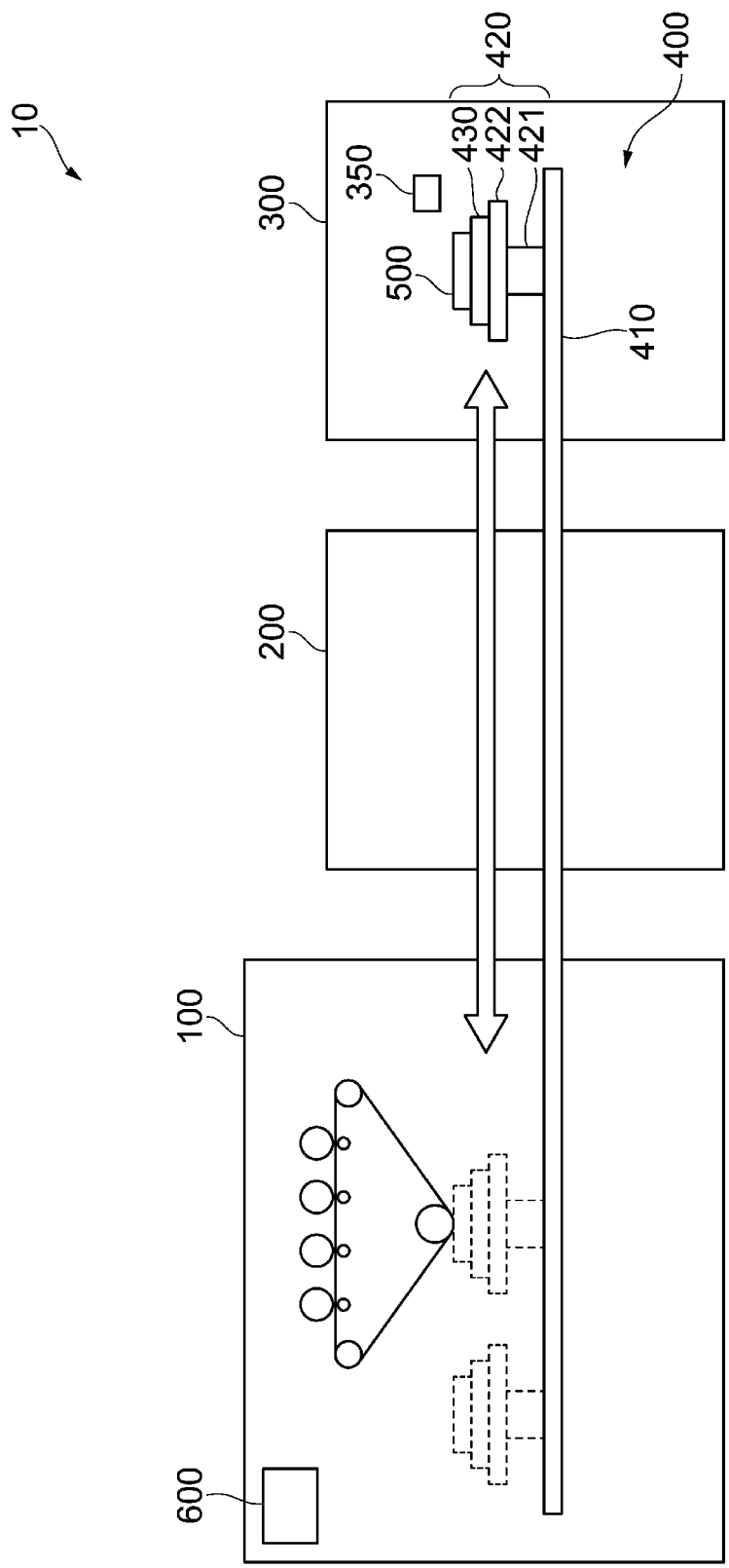
FIG. 1 illustrates a configuration of an image forming apparatus to which the present exemplary embodiment is applied.

FIG. 1 illustrates a configuration of an image forming apparatus to which the present exemplary embodiment is applied. The image forming apparatus 10 includes a transfer unit 100, a fixing unit 200, a medium attaching detaching unit 300, and a transport mechanism 400. Furthermore, the image forming apparatus 10 includes a controller 600 having one or more processors, which are computing units, a memory serving as a working region in data processing, and a storage device that holds a program and data. Although the controller 600 is a single controller that controls operation of the whole image forming apparatus 10 in this example, the controller 600 may be individually provided in units such as the transfer unit 100, the fixing unit 200, and the transport mechanism 400.

The transfer unit 100 is a unit that transfers an image formed with particles such as toner onto a recording medium 500 (hereinafter simply referred to as a medium 500). The fixing unit 200 is a unit that fixes, on a surface of the medium 500, an image transferred by the transfer unit 100 by heating the medium 500. The medium attaching detaching unit 300 is a unit in which a user of the image forming apparatus 10 attaches the medium 500 to an attachment table (described later) provided in the transport mechanism 400. The transport mechanism 400 is provided across the transfer unit 100, the fixing unit 200, and the medium attaching detaching unit 300, and transports the medium 500 on which an image is to be printed to the units 100, 200, and 300 as indicated by the arrow in FIG. 1.

Configuration of Transfer Unit 100

Figure 2:
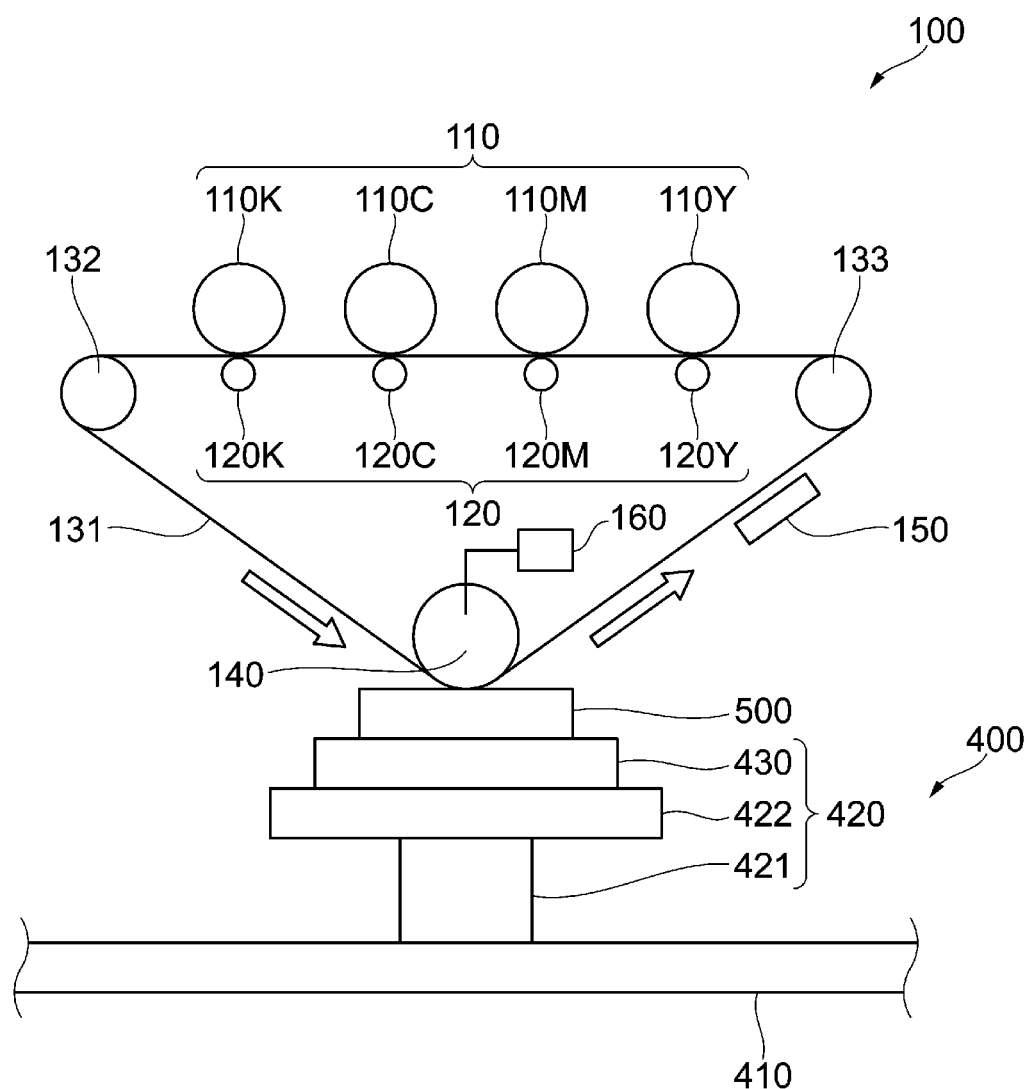
FIG. 2 illustrates a configuration of a transfer unit.

FIG. 2 illustrates a configuration of the transfer unit 100. The transfer unit 100 forms an image with charged particles and transfers the image onto the medium 500 by generating an electric field. The transfer unit 100 includes a developing device 110, a first transfer roll 120, and an intermediate transfer belt 131. The intermediate transfer belt 131 is tensioned between the developing device 110 and a position where an image is transferred onto the medium 500 by rollers 132 and 133 and a backup roll 140. Furthermore, the transfer unit 100 includes a cleaning device 150 for removing particles attached to the intermediate transfer belt 131. Furthermore, the transfer unit 100 includes a power source 160 that applies a predetermined voltage to the backup roll 140.

The developing device 110 is a unit that forms, on a photoreceptor, an electrostatic latent image of an image to be transferred and develops the image by attaching charged particles to the electrostatic latent image on the photoreceptor. As the developing device 110, an existing device used in an electrophotographic image forming apparatus can be used. FIG. 2 illustrates an example of a configuration employed in a case where color image formation processing is performed by using four colors, that is, three colors: yellow, magenta, and cyan, and an additional one color: black. The developing device 110 is provided for each of these colors, and the developing devices 110 for yellow, magenta, cyan, and black are given alphabets (color signs) Y, M, C, and K indicative of the colors in FIG. 2. In the following description, the suffixes are omitted in a case where the colors of the developing devices 110 need not be distinguished although the suffixes Y, M, C, and K are given to the reference signs in a case where the colors are distinguished.

The first transfer roll 120 is a unit used to transfer (first transfer) an image formed by the developing device 110 onto the intermediate transfer belt 131. The first transfer roll 120 is disposed so as to face the photoreceptor of the developing device 110, and the intermediate transfer belt 131 is located between the developing device 110 and the first transfer roll 120. The first transfer roll 120 is provided corresponding to each of the developing devices 110Y, 110M, 110C, and 110K. In FIG. 2, the first transfer rolls 120 corresponding to the developing devices 110Y, 110M, 110C, and 110K of the respective colors are given alphabets (color signs) Y, M, C, and K indicative of the colors. In the following description, the suffixes are omitted in a case where the colors of the first transfer rolls 120 need not be distinguished although the suffixes Y, M, C, and K are given to the reference signs in a case where the colors are distinguished.

The intermediate transfer belt 131, the rollers 132 and 133, and the backup roll 140 are units used to transfer an image formed by the developing device 110 onto the medium 500. As illustrated in FIG. 2, the intermediate transfer belt 131 rotates in a direction indicated by the arrows in FIG. 2 (a counterclockwise direction in the example illustrated in FIG. 2) while being suspended around the rollers 132 and 133 and the backup roll 140 in a tensioned state. For example, one or both of the rollers 132 and 133 is(are) a roller(s) that is(are) driven to rotate, and the intermediate transfer belt 131 is pulled by rotation of this (these) roller(s). In this way, the intermediate transfer belt 131 rotates.

An outer surface of the intermediate transfer belt 131 in the example of the configuration in FIG. 2 is a surface (hereinafter referred to as a "transfer surface") on which an image is held. An image is transferred from the photoreceptor of the developing device 110 onto the transfer surface of the intermediate transfer belt 131 when the intermediate transfer belt 131 passes between the developing device 110 and the first transfer roll 120. In the example of the configuration illustrated in FIG. 2, images of the respective colors: yellow (Y), magenta (M), cyan (C), and black (K) are superimposed on the transfer surface by the developing devices 110Y, 110M, 110C, and 110K and the first transfer rolls 120Y, 120M, 120C, and 120K, and thus a multi-color image is formed.

The backup roll 140 transfers (second transfer) the image onto the medium 500 by bringing the transfer surface of the intermediate transfer belt 131 into contact with the medium 500. A predetermined voltage is applied to the backup roll 140 by the power source 160 when the image is transferred. This generates an electric field (hereinafter referred to as a "transfer electric field") in a range including the backup roll 140 and the medium 500, thereby transferring the image formed with charged particles from the intermediate transfer belt 131 onto the medium 500. As described above, to transfer an image from the intermediate transfer belt 131 onto the medium 500, an electric current need to flow from the backup roll 140 to the medium 500 through the intermediate transfer belt 131. In a case where the medium 500 is a conductor such as a metal, an electric current flows through the medium 500 itself, and therefore an image is transferred onto a surface of the medium 500 by generating a transfer electric field. On the other hand, in a case where the medium 500 is not a conductor, no electric current flows through the medium 500, and therefore an image cannot be transferred in this state. In view of this, in a case where the medium 500 is not a conductor, an electric current is passed through the medium 500 by taking a measure such as forming a layer made of an electrically conductive material (hereinafter referred to as an "electrically conductive layer") in advance in at least a region on the surface of the medium 500 where an image is to be formed.

A procedure of transfer of an image by the intermediate transfer belt 131 is described. When the intermediate transfer belt 131 rotates, images of the respective colors: yellow (Y), magenta (M), cyan (C), and black (K) are sequentially superimposed on the transfer surface (outer surface in FIG. 2) of the intermediate transfer belt 131 by the developing devices 110Y, 110M, 110C, and 110K and the first transfer rolls 120Y, 120M, 120C, and 120K, and thus a multi-color image is formed. When the intermediate transfer belt 131 further rotates, the image formed on the transfer surface of the intermediate transfer belt 131 reaches a position (hereinafter referred to as a "transfer position") where the intermediate transfer belt 131 makes contact with the medium 500. As described above, a voltage is applied to the backup roll 140. This generates a transfer electric field, thereby transferring the image from the intermediate transfer belt 131 onto the medium 500.

The cleaning device 150 is a unit that removes particles attached to the transfer surface of the intermediate transfer belt 131. The cleaning device 150 is provided at a position on a downstream side relative to the transfer position and an upstream side relative to the developing device 110Y and the first transfer roll 120Y in a direction in which the intermediate transfer belt 131 rotates. With this configuration, particles remaining on the transfer surface of the intermediate transfer belt 131 are removed by the cleaning device 150 after the image is transferred from the intermediate transfer belt 131 onto the medium 500. In a next operation cycle, an image is newly transferred (first transfer) onto the transfer surface from which particles have been removed.

Configuration of Transport Mechanism 400 and Attachment Structure for Attachment of Medium 500

An attachment structure for attachment of the medium 500 is described. In the present exemplary embodiment, it is assumed that the medium 500 can have various thicknesses and shapes. In a case where the medium 500 directly placed on a transport path constituted by a belt and a roller is transported, it is difficult to bring the intermediate transfer belt 131 into contact with the medium 500 in a predetermined relationship since a height of the medium 500 relative to the transport path varies at the transfer position of the transfer unit 100 in a case where a thickness and a shape of the medium 500 vary. Specifically, such a situation can occur in which the medium 500 does not make contact with the intermediate transfer belt 131 in a case where the height of the medium 500 is low, and a strong shock is caused when the medium 500 makes contact with the intermediate transfer belt 131 in a case where the height of the medium 500 is high. In view of this, the transport mechanism 400 according to the present exemplary embodiment has the attachment table 420 having a height adjuster and transports the medium 500 placed on the attachment table 420 together with the attachment table 420.

The transport mechanism 400 includes the transport rail 410 that specifies a transport path for the medium 500 and the attachment table 420 that moves on the transport rail 410 (see FIG. 2). The attachment table 420 includes a leg part 421 attached to the transport rail 410 and a table part 422 on which the medium 500 is to be placed. Furthermore, a jig 430 that holds the medium 500 on the table part 422 is attached to the table part 422.

In the example of the configuration illustrated in FIG. 1, the transport rail 410 is disposed so as to extend from the medium attaching detaching unit 300 to the transfer unit 100 while passing the fixing unit 200. An end portion of the transport rail 410 on a medium attaching detaching unit 300 side is the transport start position and the transport end position. The attachment table 420 is transported leftward in FIG. 1 from the transport start position of the medium attaching detaching unit 300, and an image is transferred onto the medium 500 in the transfer unit 100. Then, the attachment table 420 is transported rightward in FIG. 1, and reaches the transport end position of the medium attaching detaching unit 300 after the image is fixed on the medium 500 in the fixing unit 200.

The leg part 421 is attached to the transport rail 410 and moves on the transport rail 410. A mechanism for moving the leg part 421 on the transport rail 410 is not limited in particular. For example, the leg part 421 may be provided with a driving device so as to be movable on its own or the transport rail 410 may be provided with a unit that pulls the leg part 421. Furthermore, the leg part 421 has a height controller that controls a height of the table part 422. A configuration of the height controller is not limited in particular. For example, the table part 422 may be moved up and down by rack and pinion and a drive motor. Alternatively, the height of the table part 422 may be controlled by manually operating a gear that is linked with the height of the table part 422. Furthermore, various methods can be used as an operation method for controlling the height. For example, an input interface for input to a controller of the drive motor may be prepared, and an operator of the image forming apparatus 10 may manually input and set height data by using the input interface. Alternatively, the height of the medium 500 attached to the attachment table 420 may be automatically detected by using a sensor, and the drive motor may be controlled so that the medium 500 is located at an appropriate height.

The table part 422 is a table that is attached to the leg part 421 and on which the medium 500 is placed with the jig 430 interposed therebetween. The table part 422 is provided with a fastener (not illustrated) for positioning the jig 430. Any jigs 430 compatible with this fastener can be positioned and attached to the table part 422 irrespective of shapes thereof.

Furthermore, the table part 422 is attached so as to float up and sink down with respect to the leg part 421 in accordance with a pressure applied from an upper side. The configuration in which the table part 422 floats up and sinks down is, for example, realized by interposing an elastic body at a portion where the table part 422 and the leg part 421 are joined. By employing such a configuration, a shock caused when the medium 500 held by the jig 430 attached to the table part 422 makes contact with the intermediate transfer belt 131 of the transfer unit 100 is lessened.

The table part 422 according to the present exemplary embodiment is made of an electrically conductive material. Furthermore, the table part 422 is in contact with a grounding member (not illustrated) and is connected to ground with the grounding member interposed therebetween.

The jig 430 is an example of a support unit and is a device that holds the medium 500 and is attached to the table part 422. A portion of the jig 430 attached to the table part 422 has a shape and a structure compatible with the fastener of the table part 422. Furthermore, the jig 430 has a shape for holding the medium 500. Therefore, media 500 having various shapes and sizes can be placed on the attachment table 420 by preparing jigs 430 compatible with the shapes and sizes of the media 500.

The jig 430 according to the present exemplary embodiment is made of an electrically conductive material. Furthermore, the portion of the jig 430 attached to the table part 422 is conductive with the table part 422. Furthermore, the jig 430 supports the medium 500 so as to be conductive with a surface (an image formation surface, which will be described later) of the medium 500 including a region where an image is to be formed. In this way, the image formation surface of the medium 500 supported by the jig 430 is connected to ground with the jig 430 and the table part 422 interposed therebetween.

Note that a relationship between the jig 430 and the medium 500 will be described in detail later.

Preliminary Operation of Image Formation

The image forming apparatus 10 according to the present exemplary embodiment has the transport mechanism 400 configured as above and therefore can print an image on any of the media 500 having various shapes and sizes. However, before start of image transfer operation, the height of the table part 422 is controlled in order to prevent a strong shock from being caused by contact of the medium 500 with the intermediate transfer belt 131 of the transfer unit 100 or prevent failure to bring the medium 500 into contact with the intermediate transfer belt 131 when an image is transferred onto the medium 500.

Figure 3A:
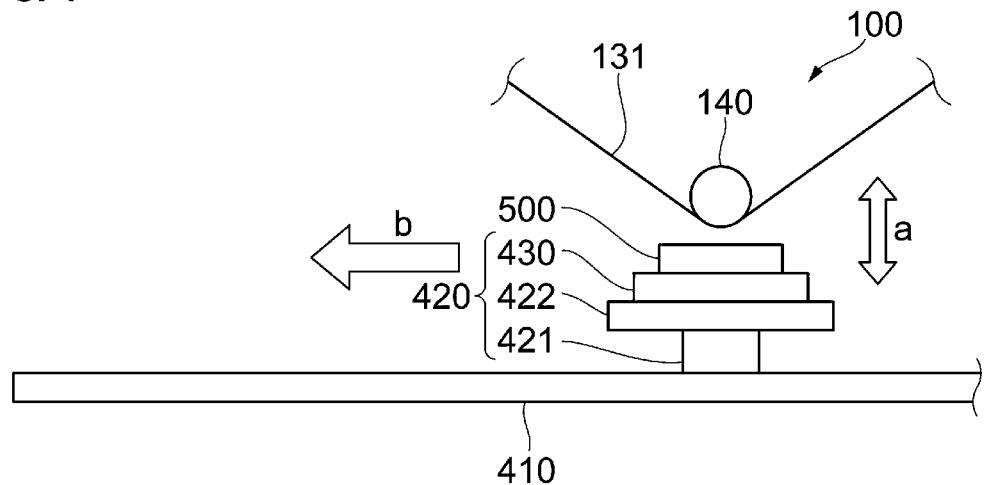
FIGS. 3A to 3C illustrate operation of a transport mechanism before start of image formation by the transfer unit.
Figure 3B:
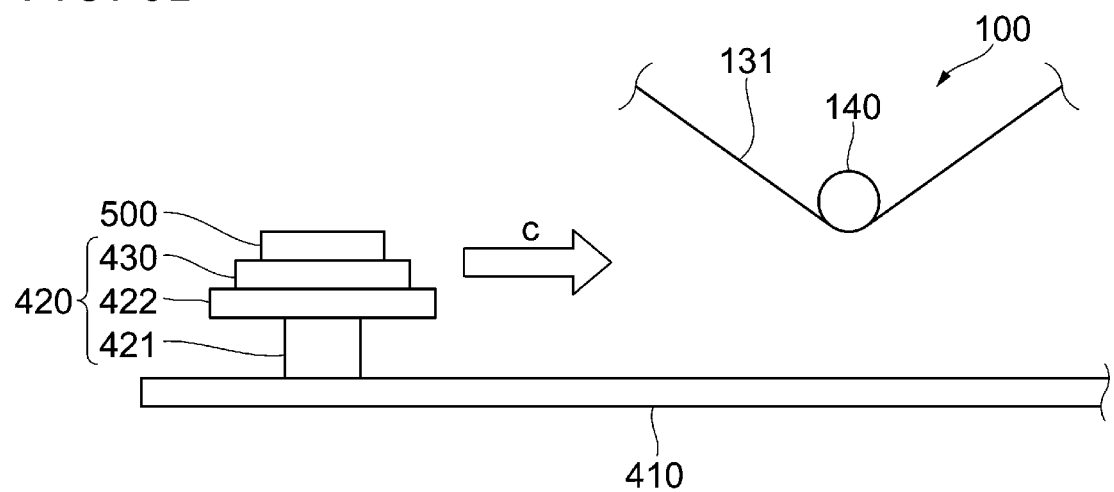
Figure 3C:
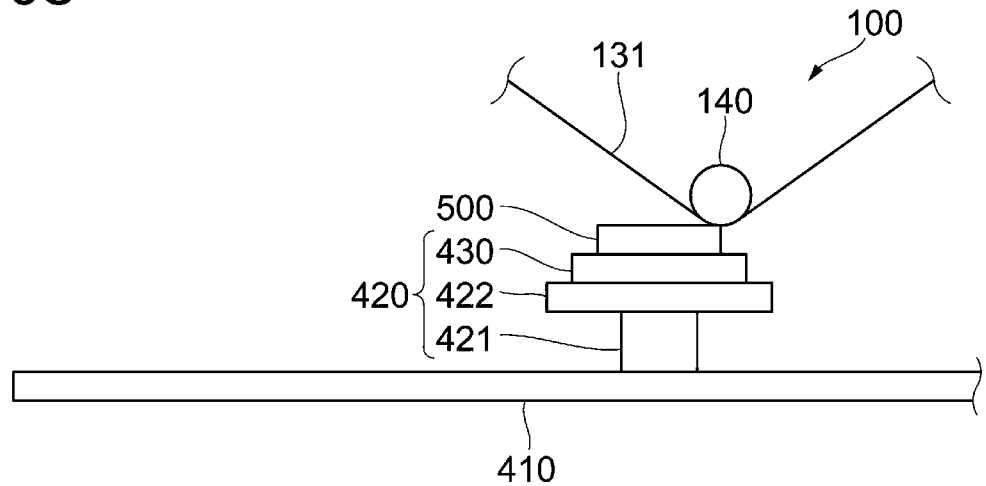

FIGS. 3A to 3C illustrate operation of the transport mechanism 400 before start of image formation by the transfer unit 100. FIG. 3A illustrates how the height is controlled, FIG. 3B illustrates a state where the attachment table 420 has retreated to a preparation position after the height control, and FIG. 3C illustrates a state where the transfer unit 100 starts transfer of an image.

In a case where an image is formed on the medium 500, first, the medium 500 held by the jig 430 is placed on the attachment table 420 at the transport start position of the medium attaching detaching unit 300. Then, the medium 500 is lowered to a height at which the medium 500 does not make contact with the intermediate transfer belt 131 of the transfer unit 100 by the height controller of the attachment table 420, and then the attachment table 420 on which the medium 500 is placed is moved to a position below the transfer position of the transfer unit 100.

Next, the height of the attachment table 420 is controlled so that the medium 500 makes contact with the intermediate transfer belt 131 with a strength appropriate for transfer of the image at the transfer position (arrow a in FIG. 3A). When the height is controlled, information on an appropriate height (hereinafter referred to as a "transfer execution height") thus obtained is held, for example, in the memory of the controller 600 (see FIG. 1). Then, the attachment table 420 is lowered to a height where the medium 500 does not make contact with the intermediate transfer belt 131 and moves to the preparation position for transfer operation (arrow b in FIG. 3A).

When the attachment table 420 moves to the preparation position, the height of the attachment table 420 is adjusted to the transfer execution height on the basis of the information obtained in the height control. Then, the attachment table 420 moves to the transfer position (arrow c in FIG. 3B), and transfer of the image starts when the medium 500 makes contact with the intermediate transfer belt 131 at the transfer position (FIG. 3C).

Configuration of Fixing Unit 200

After the image is transferred onto the medium 500 in the transfer unit 100, the image is fixed in the fixing unit 200. In the present exemplary embodiment, an image is formed on any of the media 500 having various thicknesses and shapes, and therefore the fixing processing is performed by a non-contact-type device. The fixing unit 200 melts particles forming the image transferred onto the medium 500 by heating the particles and thereby fixes the particles on the surface of the medium 500.

Figure 4A:
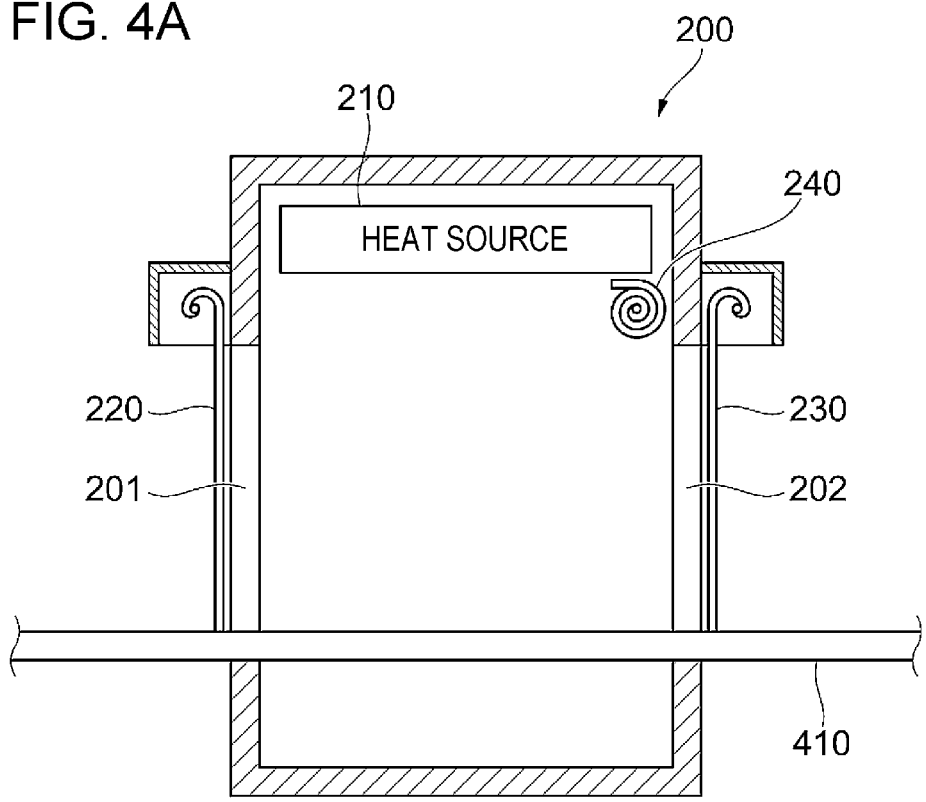
FIGS. 4A and 4B illustrate a configuration and operation of a fixing unit.
Figure 4B:
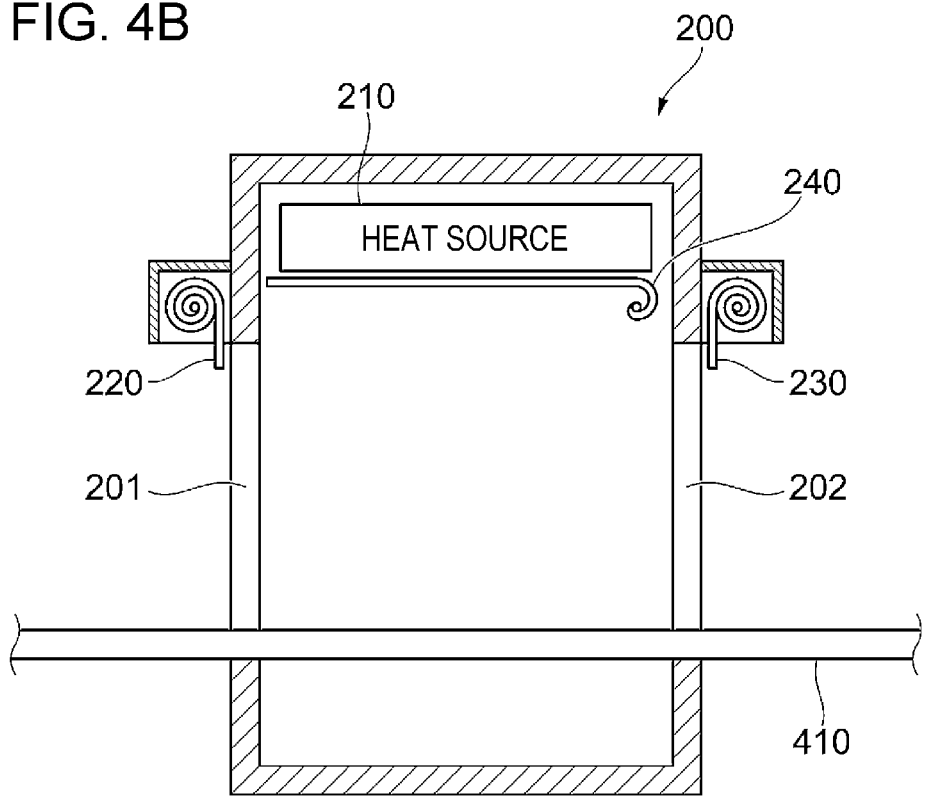

FIGS. 4A and 4B illustrate a configuration and operation of the fixing unit 200. FIG. 4A illustrates a state where openings of the fixing unit 200 are closed, and FIG. 4B illustrates a state where the openings of the fixing unit 200 are opened. The fixing unit 200 includes a carry-in opening 201, which is an opening through which the medium 500 is carried into the fixing unit 200, and a carry-out opening 202, which is an opening through which the medium 500 is carried out of the fixing unit 200. Furthermore, the carry-in opening 201 and the carry-out opening 202 of the fixing unit 200 according to the present exemplary embodiment are provided with an opening and closing member and are configured to be opened when the medium 500 is carried into or out of the fixing unit 200 and be closed when the fixing processing is performed.

The fixing unit 200 includes a heat source 210 for thermal fixation. The heat source 210 can be, for example, any of various existing heat sources such as a halogen lamp, a ceramic heater, and an infrared lamp. Instead of the heat source 210, a device that heats particles forming the image by emitting infrared laser may be used. The fixing unit 200 according to the present exemplary embodiment is provided with a member that can cover the heat source 210, and is configured so that the heat source 210 is exposed when the fixing processing is performed.

In the example illustrated in FIGS. 4A and 4B, roll-up shutters 220 and 230 are provided as the opening and closing members of the carry-in opening 201 and the carry-out opening 202. The shutters 220 and 230 are closed (see FIG. 4A) except when the medium 500 is carried into and out of the fixing unit 200 and thereby prevent a decrease in internal temperature. The shutter 220 of the carry-in opening 201 opens when the medium 500 is carried into the fixing unit 200, and the shutter 230 of the carry-out opening 202 opens when the medium 500 is carried out of the fixing unit 200 (see FIG. 4B).

In the example illustrated in FIGS. 4A and 4B, a roll-up shutter 240 is provided as the covering member that covers the heat source 210. The shutter 240 closes in a case where the shutter 220 of the carry-in opening 201 and/or the shutter 230 of the carry-out opening 202 open(s) (see FIG. 4B). This may keep a decrease in temperature of the heat source 210 small even in a case where the carry-in opening 201 and/or the carry-out opening 202 open(s) and the internal temperature decreases.

In the example illustrated in FIG. 4B, a state where both of the shutter 220 of the carry-in opening 201 and the shutter 230 of the carry-out opening 202 are opened is illustrated for convenience of description. In actual operation, the shutter 230 of the carry-out opening 202 remains closed when the medium 500 is carried into the fixing unit 200, and the shutter 220 of the carry-in opening 201 remains closed when the medium 500 is carried out of the fixing unit 200. This keeps a decrease in internal temperature small.

The shutters 220, 230, and 240 illustrated in FIGS. 4A and 4B are an example of the opening and closing members of the carry-in opening 201 and the carry-out opening 202 and the covering member of the heat source 210. The opening and closing members and covering member are not limited to the above configuration, as long as the opening and closing members and covering member keep a decrease in internal temperature of the fixing unit 200 and temperature of the heat source 210 small. For example, an opening and closing door may be provided instead of the shutters 220, 230, and 240 illustrated in FIGS. 4A and 4B. As the opening and closing member of the carry-out opening 202 through which the medium 500 passes after the fixing processing is finished, a curtain made of a heat insulating material or air curtain may be used to prevent leakage of internal air.

Configuration of Medium Attaching Detaching Unit 300

See FIG. 1 again. As described above, the medium attaching detaching unit 300 is a unit that is located at the transport start position and the transport end position, which are an end portion of the transport rail 410. In the medium attaching detaching unit 300, the jig 430 is attached and detached to and from the attachment table 420 or the medium 500 is attached and detached to and from the jig 430 attached to the attachment table 420.

Furthermore, the medium attaching detaching unit 300 according to the present exemplary embodiment includes a cleaning device 350 for removing particles attached to an upper surface 431 (see FIG. 5, which will be described later) of the jig 430. The cleaning device 350 has, for example, a brush, a web, or the like that makes contact with the upper surface 431 of the jig 430.

After an image is fixed on the medium 500 in the fixing unit 200, the attachment table 420 on which the jig 430 holding the medium 500 is placed moves to the transport end position of the medium attaching detaching unit 300. At the transport end position of the medium attaching detaching unit 300, the medium 500 is removed from the jig 430 attached to the attachment table 420. Then, the particles attached to the upper surface 431 of the jig 430 are removed by the cleaning device 350.

Then, a new medium 500 is placed on the jig 430, and image formation operation on this new medium 500 is performed.

As described above, in the image forming apparatus 10 according to the present exemplary embodiment, an image formed with particles is transferred from the transfer surface of the intermediate transfer belt 131 onto the medium 500 by bringing the transfer surface of the intermediate transfer belt 131 into contact with the medium 500 held by the jig 430. During this process, the transfer surface of the intermediate transfer belt 131 and the upper surface 431 of the jig 430 sometimes make contact with each other, and particles are sometimes attached from the intermediate transfer belt 131 to the upper surface 431 of the jig 430. In a case where particles are attached to the upper surface 431 of the jig 430, the particles are sometimes attached to a new medium 500 and smear the new medium 500 when the new medium 500 is placed on the jig 430 after image formation operation on the medium 500 is finished.

In the present exemplary embodiment, the particles attached to the jig 430 are removed by the cleaning device 350, and therefore it is less likely that the particles are attached to and smear the medium 500 placed on the jig 430.

Attachment of Particles to Jig 430

As described above, in the transfer unit 100 according to the present exemplary embodiment, when the attachment table 420 on which the medium 500 is placed moves to the transfer position, the backup roll 140 and the image formation surface of the medium 500 make contact with each other with the intermediate transfer belt 131 interposed therebetween. This forms a transfer electric field between the backup roll 140 and the image formation surface of the medium 500, thereby transferring an image formed with particles from the transfer surface of the intermediate transfer belt 131 onto the image formation surface of the medium 500.

As described above, the jig 430 holding the medium 500 has electric conductivity and is connected to ground with the table part 422 interposed therebetween. Accordingly, if the intermediate transfer belt 131 makes contact with the jig 430 and the backup roll 140 and the jig 430 become directly conductive with each other with the intermediate transfer belt 131 interposed therebetween when the attachment table 420 moves to the transfer position, particles are sometimes attached from the transfer surface of the intermediate transfer belt 131, for example, onto the upper surface 431 of the jig 430 due to an electric field between the backup roll 140 and the jig 430.

In the description of the present exemplary embodiment, a state where the jig 430 and members that constitute the transfer unit 100 such as the intermediate transfer belt 131 and the backup roll 140 are directly conductive with each other means a state where the jig 430 is conductive with members that constitute the transfer unit 100 by directly making contact with or facing the members without the medium 500 interposed therebetween. Specifically, in a case where the backup roll 140 and the image formation surface of the medium 500 make contact with each other with the intermediate transfer belt 131 interposed therebetween, the jig 430 is not directly conductive with the intermediate transfer belt 131 and the backup roll 140 although the jig 430 is conductive with the intermediate transfer belt 131 and the backup roll 140 with the medium 500 interposed therebetween.

In the present exemplary embodiment, the jig 430 supports the medium 500 so as not to make contact with the intermediate transfer belt 131, and thereby the jig 430 is prevented from becoming directly conductive with the intermediate transfer belt 131 and the backup roll 140. In this way, particles are less likely to be attached from the intermediate transfer belt 131 onto the jig 430.

A shape of the jig 430 and a relationship between the jig 430 and the intermediate transfer belt 131 and the backup roll 140 according to the present exemplary embodiment are described in detail below. In the following description, the transport direction means a transport direction (a direction indicated by arrow c in FIG. 3B) in which the attachment table 420, the medium 500 attached to the attachment table 420, or the like is transported from the preparation position to the transport end position by passing through the transfer position.

Figure 5:
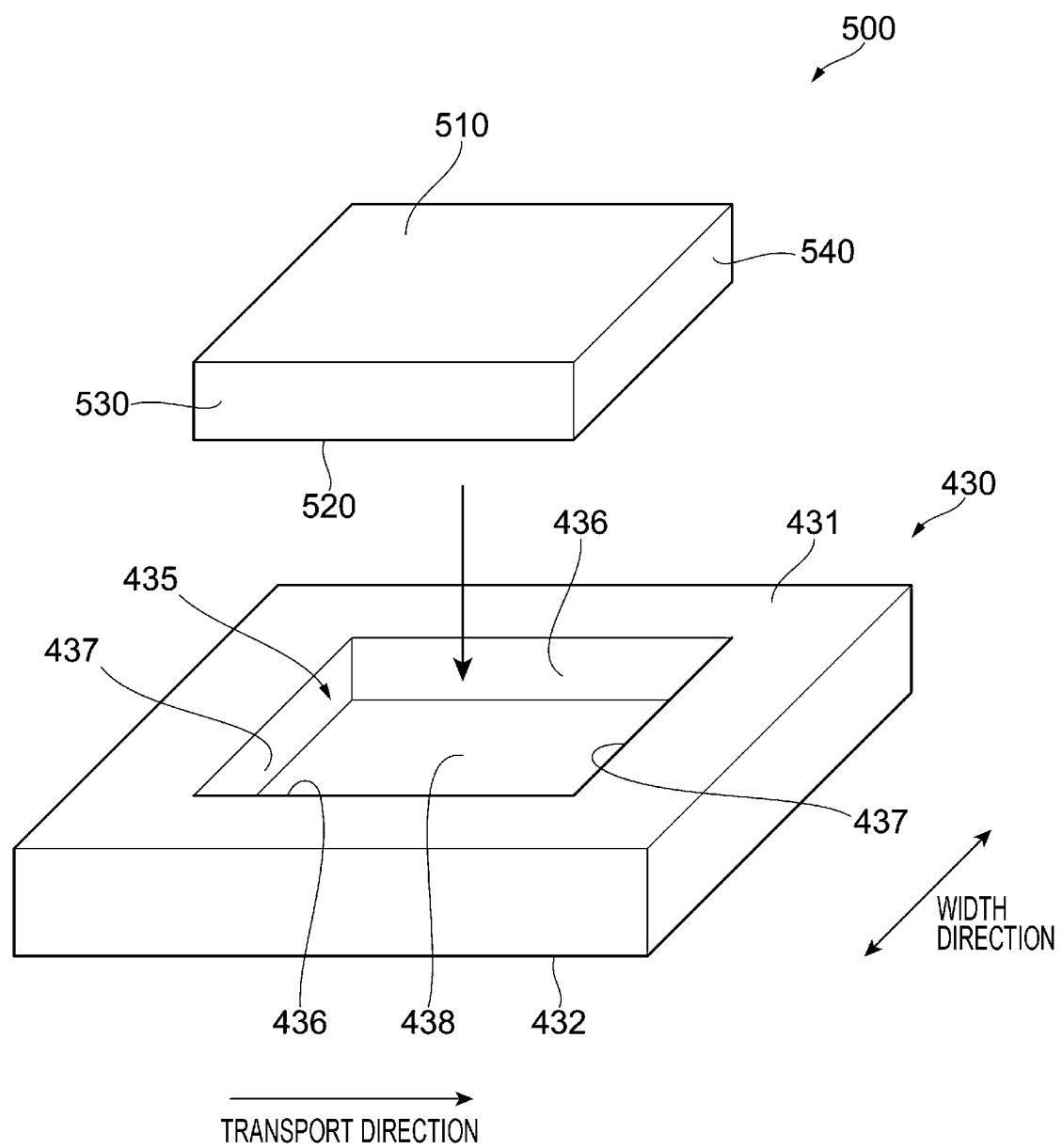
FIG. 5 is a perspective view illustrating a jig and a medium held by the jig to which the first exemplary embodiment is applied.

FIG. 5 is a perspective view illustrating the jig 430 and the medium 500 held by the jig 430 to which the first exemplary embodiment is applied.

Figure 6A:
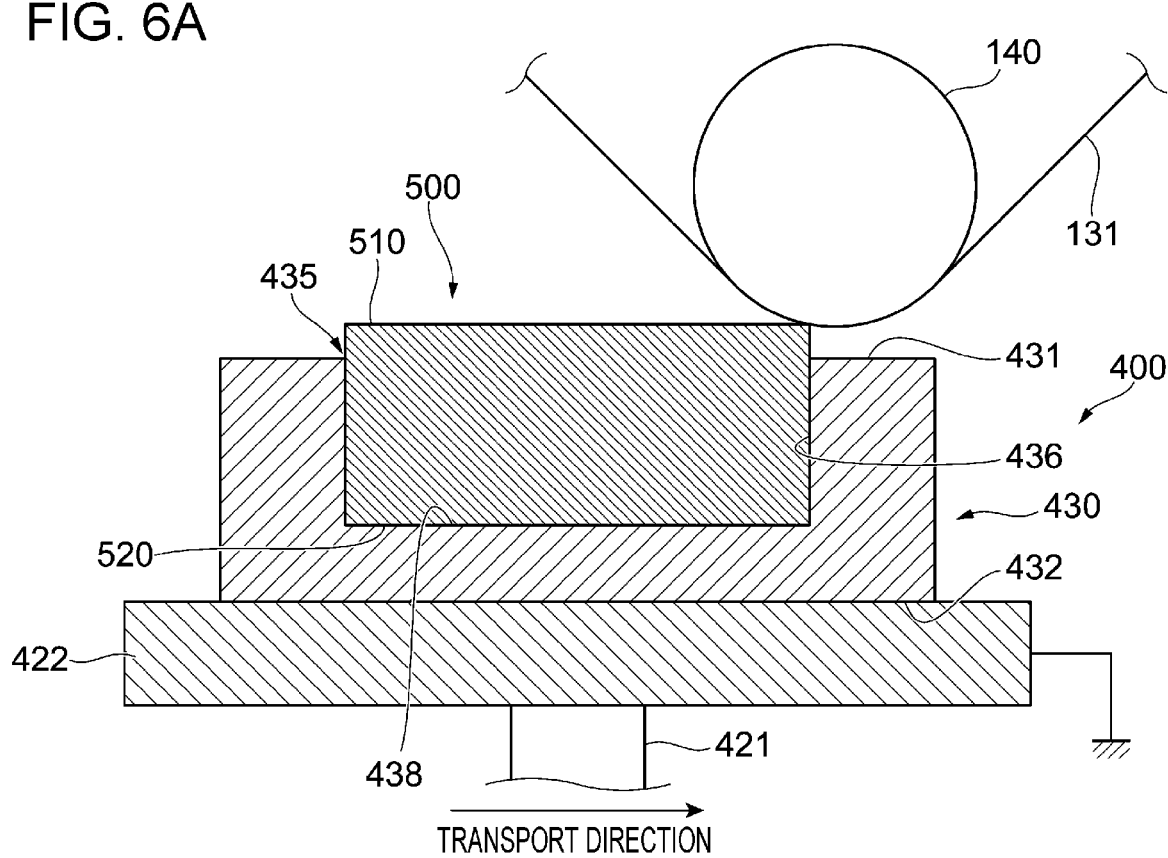
FIGS. 6A and 6B illustrate a relationship between (i) the jig and the medium to which the first exemplary embodiment is applied and (ii) an intermediate transfer belt and a backup roll.
Figure 6B:
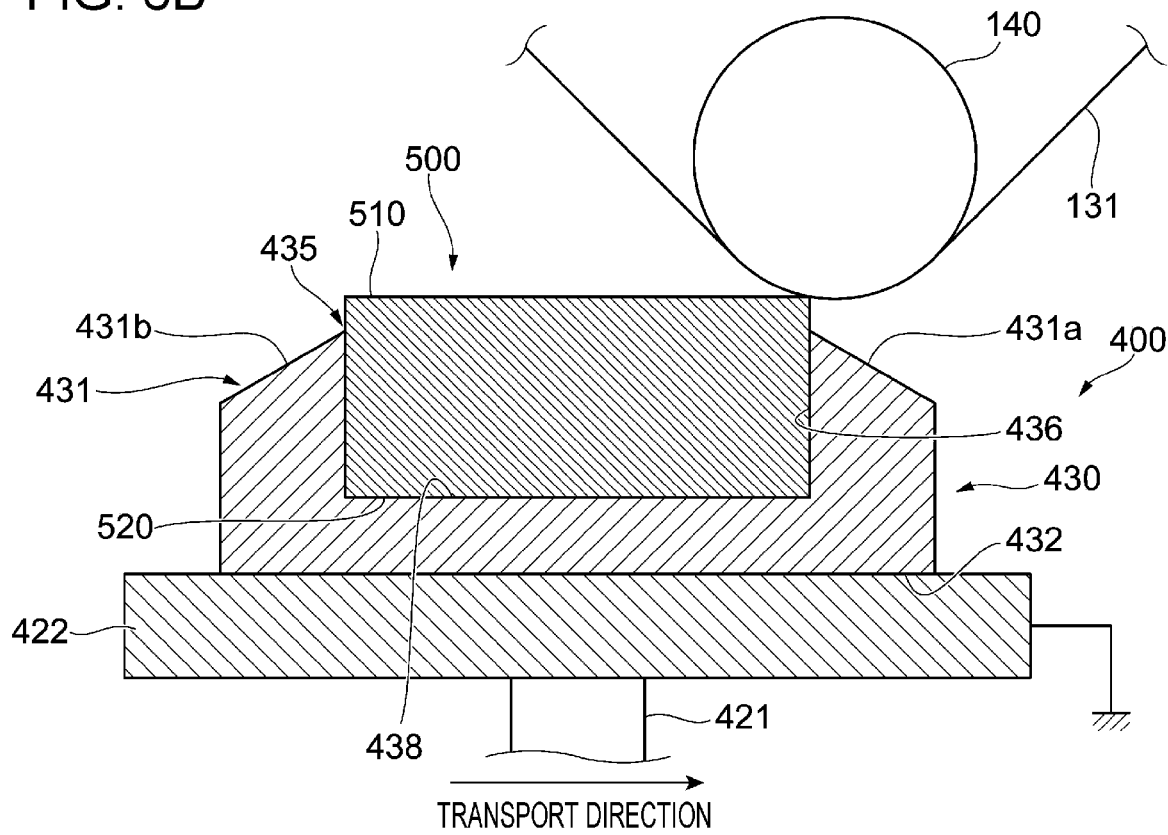

FIGS. 6A and 6B illustrate a relationship between (i) the jig 430 and the medium 500 to which the first exemplary embodiment is applied and (ii) the intermediate transfer belt 131 and the backup roll 140, and FIG. 6A illustrates an example using the jig 430 illustrated in FIG. 5, and FIG. 6B illustrates an example using a modification of the jig 430. Note that FIGS. 6A and 6B are cross-sectional views of the jig 430 and the medium 500 taken along the transport direction at a central part in a width direction thereof.

The medium 500 according to the present exemplary embodiment has a front surface 510 and a rear surface 520 that are rectangular, a pair of first side surfaces 530 that connect the front surface 510 and the rear surface 520 and face each other, and a pair of second side surfaces 540 that connect the front surface 510 and the rear surface 520 and face each other, and has a flattened rectangular parallelepiped shape as a whole. In this example, the front surface 510 of the medium 500 is the image formation surface including the region where an image is to be formed. The whole medium 500 including the front surface 510, which is the image formation surface, according to the present exemplary embodiment is made of a conductor.

As described above, the jig 430 holds the medium 500 and is attached to the table part 422.

The jig 430 according to the present exemplary embodiment has the rectangular upper surface 431 that faces the intermediate transfer belt 131 when transported to the transfer position and a rectangular lower surface 432 opposite to the upper surface 431, and has a rectangular parallelepiped shape as a whole. The jig 430 is attached to the table part 422 so that the lower surface 432 faces the table part 422, and the jig 430 is conductive with the table part 422 through the lower surface 432.

Furthermore, the jig 430 has, in a central part thereof in the transport direction of the transport mechanism 400, a recessed part 435 that is recessed from the upper surface 431 toward the lower surface 432. The medium 500 is inserted into a space formed inside the recessed part 435 of the jig 430, and thus the medium 500 is supported in the recessed part 435. In this example, the medium 500 is inserted into the recessed part 435 of the jig 430 so that the pair of first side surfaces 530 extend along the transport direction in which the medium 500 is transported by the transport mechanism 400 and the pair of second side surfaces 540 extend along a width direction of the medium 500 orthogonal to the transport direction.

The recessed part 435 of the jig 430 has an inner peripheral surface that matches the shape of the medium 500. Specifically, the recessed part 435 has a pair of first inner peripheral surfaces 436 that extend along the transport direction of the transport mechanism 400 and face each other with the space in the recessed part 435 interposed therebetween and a pair of second inner peripheral surfaces 437 that extend along the width direction orthogonal to the transport direction of the transport mechanism 400 and face each other with the space in the recessed part 435 interposed therebetween. Furthermore, the recessed part 435 has a bottom surface 438 extending from lower ends of the first inner peripheral surfaces 436 and the second inner peripheral surfaces 437 along the transport direction and the width direction.

In the recessed part 435, a length of each of the first inner peripheral surfaces 436 along the transport direction, in other words, an interval between the second inner peripheral surfaces 437 that face each other is equal to a length of the medium 500 in the transport direction. Furthermore, in the recessed part 435, a length of each of the second inner peripheral surfaces 437 along the width direction, in other words, an interval between the first inner peripheral surfaces 436 that face each other is equal to a length of the medium 500 along the width direction.

Furthermore, a height of the first inner peripheral surfaces 436 and the second inner peripheral surfaces 437 of the recessed part 435 of the jig 430 according to the present exemplary embodiment, in other words, a height of the recessed part 435 from the bottom surface 438 to the upper surface 431 is lower than a height of the medium 500, more specifically, a height of the first side surfaces 530 and the second side surfaces 540 of the medium 500.

The medium 500 is inserted into the recessed part 435, and thereby the jig 430 supports the first side surfaces 530 and the second side surfaces 540, which are side surfaces of the medium 500. Specifically, when the medium 500 is inserted into the recessed part 435 of the jig 430, the first inner peripheral surfaces 436 and the second inner peripheral surfaces 437 of the recessed part 435 of the jig 430 and the first side surfaces 530 and the second side surfaces 540 of the medium 500 make contact with each other. Furthermore, the bottom surface 438 of the recessed part 435 of the jig 430 and the rear surface 520 of the medium 500 make contact with each other.

In the present exemplary embodiment, when the medium 500 is inserted into the recessed part 435, the jig 430 and the medium 500 make contact with each other, and thereby the jig 430 and the medium 500 become conductive with each other. As a result, the front surface 510 of the medium 500, which is the image formation surface, is connected to ground with the jig 430 and the table part 422 interposed therebetween.

Furthermore, in the present exemplary embodiment, the height of the recessed part 435 of the jig 430 is lower than the height of the medium 500, as described above. Accordingly, in a state where the medium 500 is in the recessed part 435 of the jig 430 attached to the table part 422, the height of the jig 430 is lower than a height of the image formation surface of the medium 500. More specifically, a height from the table part 422 to the upper surface 431 of the jig 430 is lower than a height from the table part 422 to the front surface 510 of the medium 500, which is the image formation surface. Furthermore, in a case where the attachment table 420 moves to the transfer position, a distance from the transfer surface of the intermediate transfer belt 131 to the upper surface 431 of the jig 430 is longer than a distance from the transfer surface of the intermediate transfer belt 131 to the front surface 510 of the medium 500.

Since the jig 430 and the medium 500 have such a relationship, the intermediate transfer belt 131 makes contact with the front surface 510 of the medium 500 without making contact with the upper surface 431 of the jig 430 in a case where the attachment table 420 moves to the transfer position in a state where the height of the attachment table 420 has been controlled so that the front surface 510 of the medium 500 makes contact with the intermediate transfer belt 131 with a strength appropriate for transfer of an image. Specifically, the intermediate transfer belt 131 does not make contact with a front end side of the upper surface 431 of the jig 430 in the transport direction before the intermediate transfer belt 131 makes contact with the front surface 510 of the medium 500.

Then, an image is transferred from the transfer surface of the intermediate transfer belt 131 onto the front surface of the medium 500 without bringing the intermediate transfer belt 131 into contact with regions of the upper surface 431 of the jig 430 on both end sides in the width direction of the medium 500 while the intermediate transfer belt 131 is in contact with the front surface 510 of the medium 500.

Furthermore, after the image is transferred from the transfer surface of the intermediate transfer belt 131 onto the front surface 510 of the medium 500, the attachment table 420 is moved from the transfer position to the transport end position without bringing the intermediate transfer belt 131 into contact with a rear end side of the upper surface 431 of the jig 430 in the transport direction.

This keeps the upper surface 431 of the jig 430 from becoming directly conductive with the intermediate transfer belt 131 and the backup roll 140, thereby keeping particles from being attached from the transfer surface of the intermediate transfer belt 131 to the upper surface 431 of the jig 430 by a transfer electric field.

Although the upper surface 431 of the jig 430 illustrated in FIG. 6A is a flat surface extending along the transport direction of the transport mechanism 400 and the width direction of the medium 500, the upper surface 431 need not be a flat surface.

For example, the upper surface 431 of the jig 430 may have, on a front end side in the transport direction relative to the recessed part 435, an inclined surface 431a whose height decreases toward the front side in the transport direction, as illustrated in FIG. 6B. In a case where the upper surface 431 of the jig 430 has the inclined surface 431a on the front side in the transport direction, a distance from the transfer surface of the intermediate transfer belt 131 to the upper surface 431 of the jig 430 increases toward the front side in the transport direction. With this configuration, when the attachment table 420 enters the transfer position, the transfer surface of the intermediate transfer belt 131 and the front end of the upper surface 431 of the jig 430 are less likely to make contact with each other. This further keeps particles from being attached from the transfer surface of the intermediate transfer belt 131 to the upper surface 431 of the jig 430 by a transfer electric field.

Furthermore, the upper surface 431 of the jig 430 may have, on a rear end side in the transport direction relative to the recessed part 435, an inclined surface 431b whose height decreases toward the rear side in the transport direction. In a case where the upper surface 431 of the jig 430 has the inclined surface 431b on the rear side in the transport direction, a distance from the transfer surface of the intermediate transfer belt 131 to the upper surface 431 of the jig 430 increases toward the rear side in the transport direction. With this configuration, when the attachment table 420 moves from the transfer position toward the transport end position after an image is transferred from the transfer surface of the intermediate transfer belt 131 onto the front surface 510 of the medium 500, the transfer surface of the intermediate transfer belt 131 and the rear end of the upper surface 431 of the jig 430 are less likely to make contact with each other. This further keeps particles from being attached from the transfer surface of the intermediate transfer belt 131 to the upper surface 431 of the jig 430 by a transfer electric field.

Second Exemplary Embodiment

Next, the second exemplary embodiment of the present disclosure is described. Note that constituent elements similar to those in the first exemplary embodiment are given identical reference signs, and detailed description thereof is omitted.

In the first exemplary embodiment, the jig 430 is kept from making contact with the intermediate transfer belt 131, and thereby the jig 430 is kept from becoming directly conductive with the intermediate transfer belt 131 and the backup roll 140. The second exemplary embodiment is different from the first exemplary embodiment in that the jig 430 is kept from becoming directly conductive with the intermediate transfer belt 131 and the backup roll 140 by providing an insulating layer made of an insulator on a portion of the jig 430 that makes contact with the intermediate transfer belt 131.

Figure 7A:
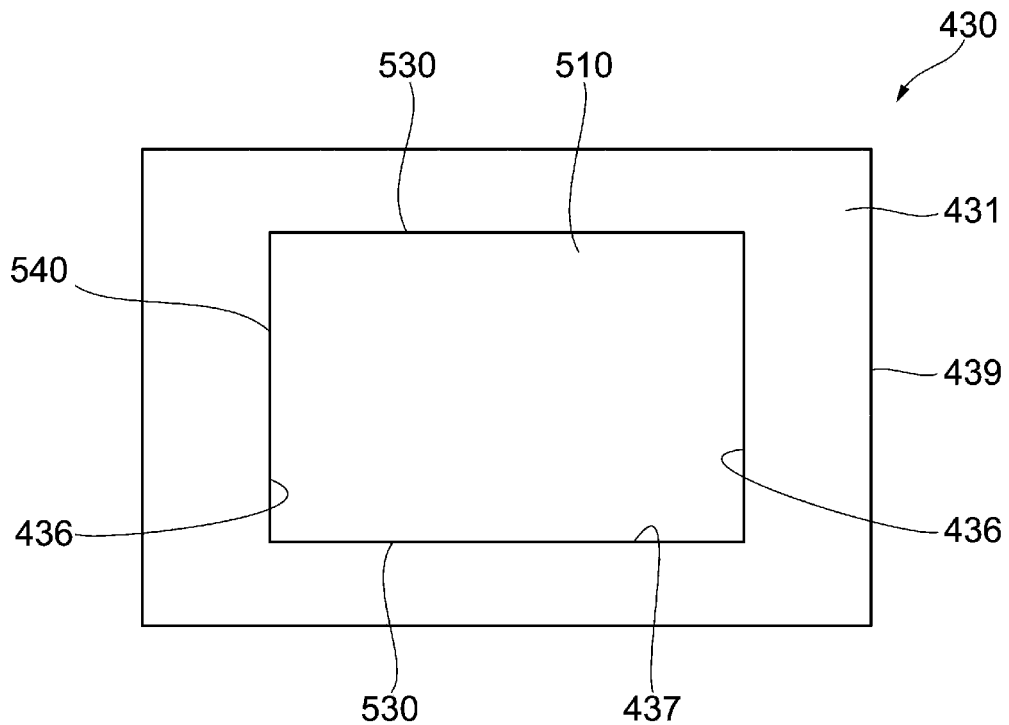
FIGS. 7A and 7B illustrate a jig and a medium to which the second exemplary embodiment is applied.
Figure 7B:
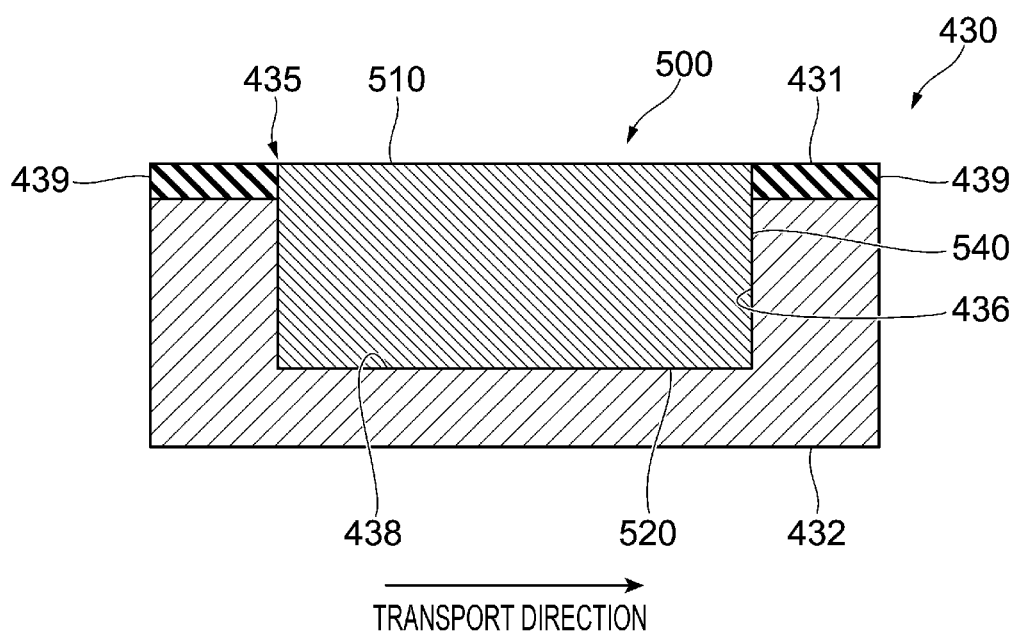

FIGS. 7A and 7B illustrate a jig 430 and a medium 500 to which the second exemplary embodiment is applied, and FIG. 7A is a view of the jig 430 and the medium 500 viewed from an upper side (intermediate transfer belt 131 side), and FIG. 7B is a cross-sectional view of the jig 430 and the medium 500 taken along a transport direction in a central part in a width direction thereof. FIG. 7B illustrates an intermediate transfer belt 131 and a backup roll 140 of a transfer unit 100 (see FIG. 1) in addition to the jig 430 and the medium 500.

The jig 430 according to the present exemplary embodiment has a rectangular parallelepiped shape having a rectangular upper surface 431 and a rectangular lower surface 432 and has a recessed part 435 in a central part in the transport direction of a transport mechanism 400 (see, for example, FIG. 1), as in the first exemplary embodiment. Furthermore, the recessed part 435 of the jig 430 has a pair of first inner peripheral surfaces 436 and a pair of second inner peripheral surfaces 437 that match a shape of the medium 500, and a bottom surface 438.

A height of the first inner peripheral surfaces 436 and the second inner peripheral surfaces 437 of the recessed part 435 of the jig 430 according to the present exemplary embodiment, in other words, a height of the recessed part 435 from the bottom surface 438 to the upper surface 431 is equal to a height of the medium 500, more specifically, a height of first side surfaces 530 and second side surfaces 540 of the medium 500, unlike the first exemplary embodiment.

Accordingly, a height of the jig 430 is same as a height of the image formation surface of the medium 500 in a state where the medium 500 is in the recessed part 435 of the jig 430. More specifically, a height from a table part 422 to the upper surface 431 of the jig 430 is same as a height from the table part 422 to a front surface 510 of the medium 500, which is the image formation surface.

As in the first exemplary embodiment, a body of the jig 430 is made of an electrically conductive material. Accordingly, the jig 430 attached to the table part 422 is conductive with the table part 422 through a lower surface 432. Furthermore, the jig 430 is conductive with the medium 500 inserted into the recessed part 435. Accordingly, the front surface 510 of the medium 500, which is the image formation surface, is connected to ground with the jig 430 and the table part 422 interposed therebetween.

Furthermore, the jig 430 according to the present exemplary embodiment has, on the upper surface 431, a non-conductive layer 439 that keeps the jig 430 from becoming directly conductive with the intermediate transfer belt 131 and the backup roll 140. The non-conductive layer 439 is a layer having lower electric conductivity than the medium 500. As the electric conductivity of the non-conductive layer 439, lower electric conductivity is more desirable, and the non-conductive layer 439 desirably has an insulation property. A material of the non-conductive layer 439 is not limited in particular, and can be, for example, an insulating resin such as a phenolic resin, ceramic such as alumina, glass, or the like.

In the present exemplary embodiment, when an attachment table 420 moves to the transfer position, the intermediate transfer belt 131 makes contact with the upper surface 431 of the jig 430 before making contact with the front surface 510 of the medium 500. With this configuration, when the attachment table 420 moves to the transfer position, a shock caused when the intermediate transfer belt 131 makes contact with the front surface 510 of the medium 500 is lessened due to the jig 430 as compared with a case where the intermediate transfer belt 131 makes contact with the front surface 510 of the medium 500 without making contact with the jig 430.

Furthermore, in the present exemplary embodiment, since the jig 430 has the non-conductive layer 439, the intermediate transfer belt 131 makes contact with the non-conductive layer 439 provided on the upper surface 431 of the jig 430 in a case where the attachment table 420 moves to the transfer position in a state where a height of the attachment table 420 has been controlled so that the front surface 510 of the medium 500 makes contact with the intermediate transfer belt 131 with a strength appropriate for transfer of an image. This keeps the jig 430 from becoming directly conductive with the intermediate transfer belt 131 and the backup roll 140, thereby keeping particles from being attached from the transfer surface of the intermediate transfer belt 131 to the upper surface 431 of the jig 430 by a transfer electric field.

Although the height of the upper surface 431 of the jig 430 is same as a height of the front surface 510 of the medium 500 in the example illustrated in FIGS. 7A and 7B, for example, the height of the upper surface 431 of the jig 430 may be lower than the height of the front surface 510 of the medium 500 as in the first exemplary embodiment. In this case, a transfer electric field may be undesirably formed between the jig 430 and the intermediate transfer belt 131 and the backup roll 140 since a distance between the intermediate transfer belt 131 and the upper surface 431 of the jig 430 becomes short depending on the height control of the attachment table 420 although the intermediate transfer belt 131 and the upper surface 431 of the jig 430 are less likely to make contact with each other when the attachment table 420 moves to the transfer position. On the other hand, by providing the non-conductive layer 439 on the upper surface 431 of the jig 430 even in a case where the intermediate transfer belt 131 and the upper surface 431 of the jig 430 do not make contact with each other, particles are further kept from being attached from the transfer surface of the intermediate transfer belt 131 to the upper surface 431 of the jig 430.

Figure 8A:
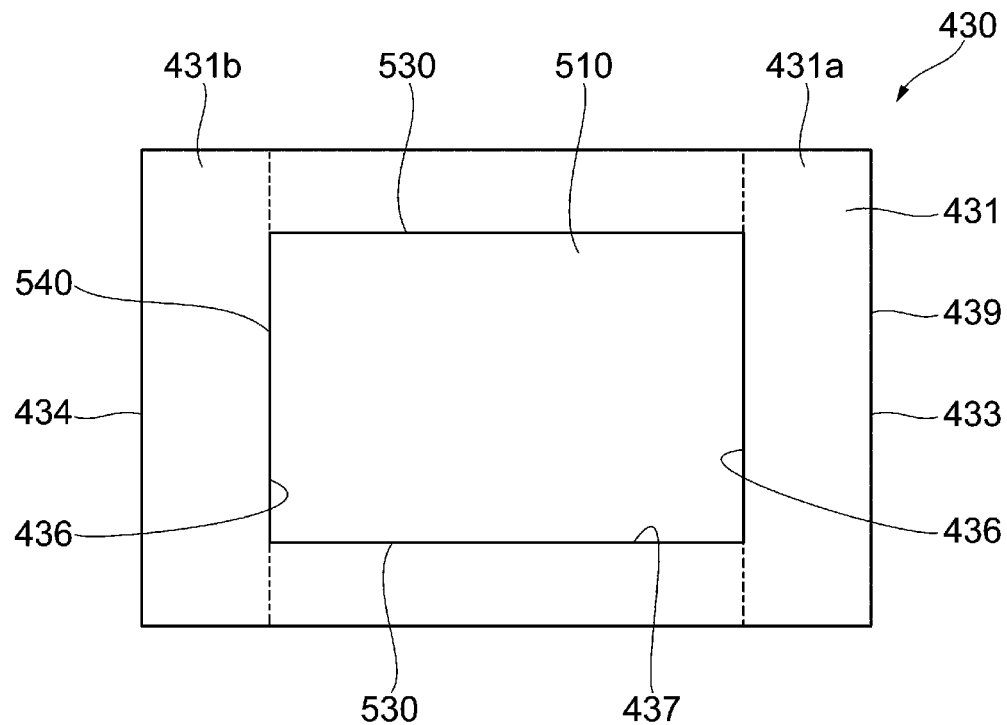
FIGS. 8A and 8B illustrate a jig and a medium to which a modification of the second exemplary embodiment is applied.
Figure 8B:
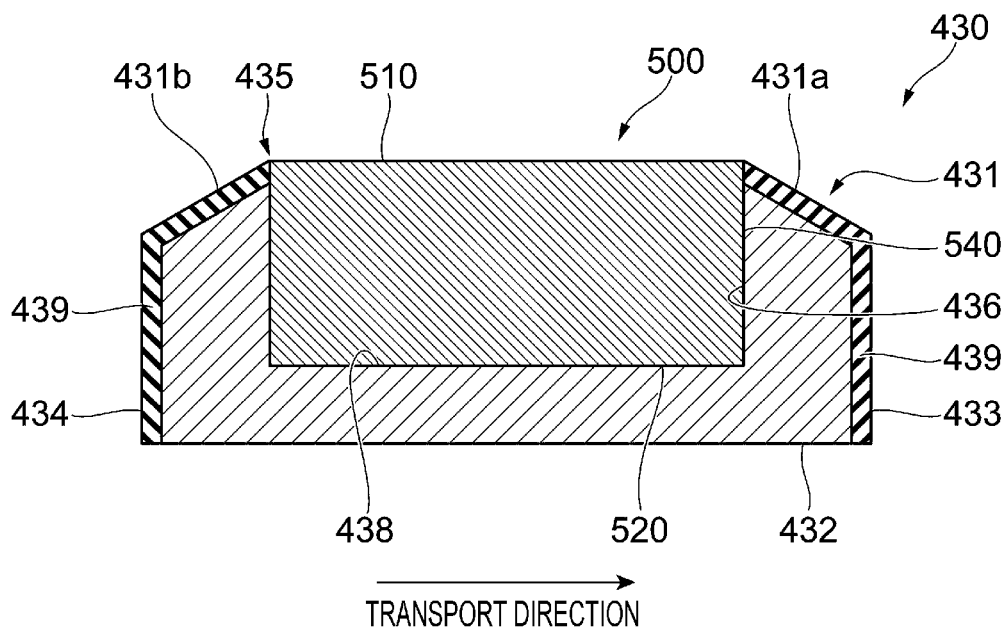
Figure 9A:
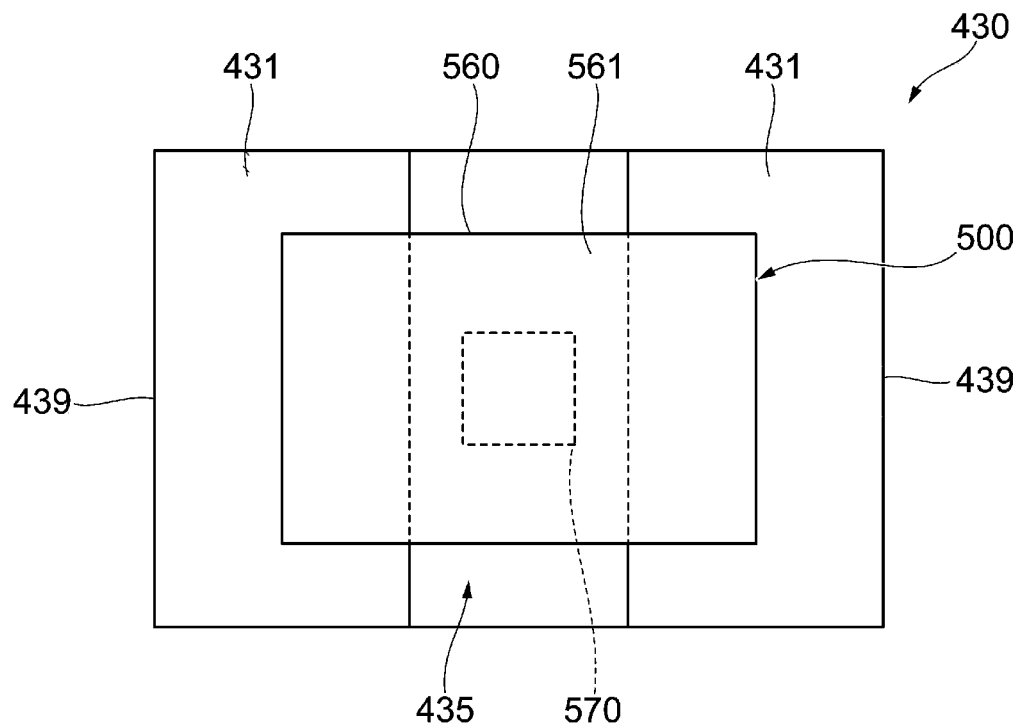
FIGS. 9A and 9B illustrate a jig and a medium to which a modification of the second exemplary embodiment is applied.
Figure 9B:
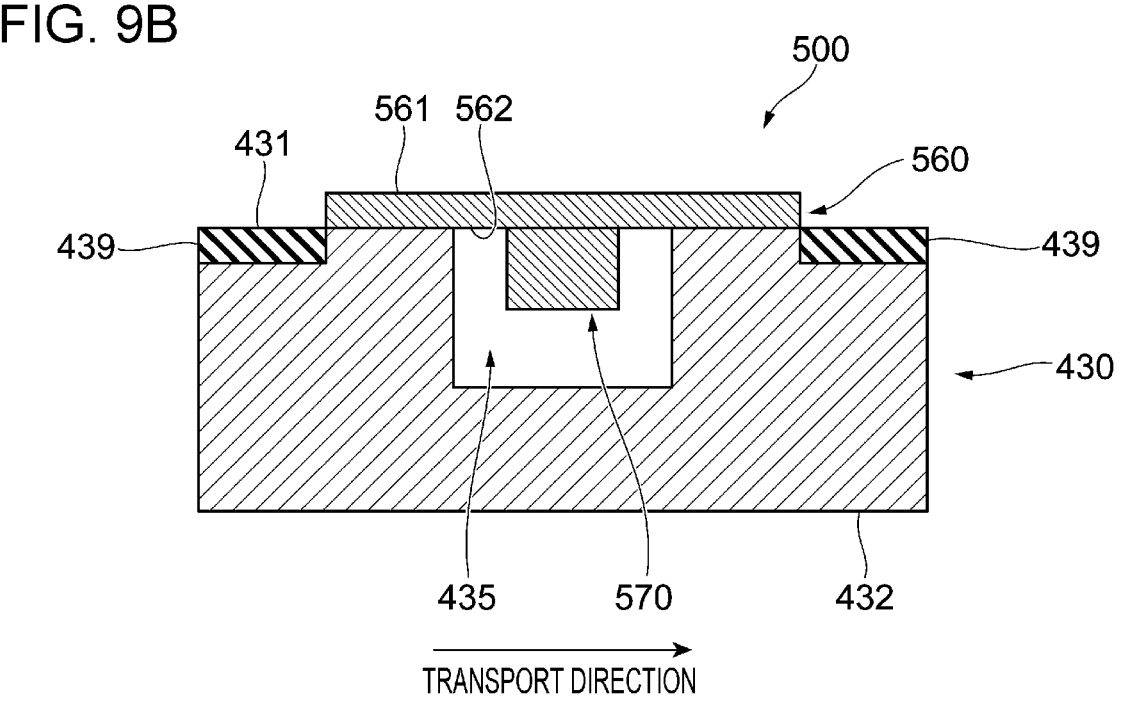

Next, a modification of the second exemplary embodiment is described. FIGS. 8A and 8B and FIGS. 9A and 9B illustrate a jig 430 and a medium 500 to which the modification of the second exemplary embodiment is applied, and FIGS. 8A and 9A are views of the jig 430 and the medium 500 viewed from an upper side (intermediate transfer belt 131 side), and FIGS. 8B and 9B are cross-sectional views of the jig 430 and the medium 500 taken along the transport direction at a central part in a width direction thereof. Note that constituent elements similar to those in the example illustrated in FIGS. 7A and 7B are given identical reference signs in FIGS. 8A and 8B and FIGS. 9A and 9B, and detailed description thereof is omitted.

In the modification illustrated in FIGS. 8A and 8B, an upper surface 431 of the jig 430 has, on a front end side in the transport direction relative to a recessed part 435, an inclined surface 431a whose height decreases toward the front side in the transport direction and has, on a rear end side in the transport direction relative to the recessed part 435, an inclined surface 431b whose height decreases toward the rear side in the transport direction, as with the jig 430 illustrated in FIG. 6B according to the first exemplary embodiment. Note that in this example, a height of a rear end portion of the inclined surface 431a that faces the recessed part 435 and a height of a front end portion of the inclined surface 431b that faces the recessed part 435 are same as a height of a front surface 510 of a medium 500 inserted into the recessed part 435 of the jig 430.

According to the jig 430 illustrated in FIGS. 8A and 8B, a non-conductive layer 439 is provided on the entire upper surface 431 including the inclined surface 431a and the inclined surface 431b. Furthermore, according to the jig 430 illustrated in FIGS. 8A and 8B, the non-conductive layer 439 is provided not only on the upper surface 431, but also on a front end side surface 433 located at a front end of the jig 430 in the transport direction and a rear end side surface 434 located at a rear end of the jig 430 in the transport direction.

In the example illustrated in FIGS. 8A and 8B, the non-conductive layer 439 keeps the jig 430 from becoming directly conductive with the intermediate transfer belt 131 and the backup roll 140 even in a case where the attachment table 420 moves to the transfer position and the intermediate transfer belt 131 makes contact with the upper surface 431 of the jig 430, as in the example illustrated in FIGS. 7A and 7B. This keeps particles from being attached from the transfer surface of the intermediate transfer belt 131 to the upper surface 431 of the jig 430 by a transfer electric field.

Furthermore, in the example illustrated in FIGS. 8A and 8B, even in a case where the intermediate transfer belt 131 makes contact with the front end side surface 433 located at the front end of the jig 430 when the attachment table 420 moves to the transfer position, the jig 430 is kept from becoming directly conductive with the intermediate transfer belt 131 and the backup roll 140 since the non-conductive layer 439 is provided on the front end side surface 433.

Similarly, in the example illustrated in FIGS. 8A and 8B, even in a case where the intermediate transfer belt 131 makes contact with the rear end side surface 434 located at the rear end of the jig 430 when the attachment table 420 moves from the transfer position toward the transport end position after an image is transferred onto the front surface 510 of the medium 500, the jig 430 is kept from becoming directly conductive with the intermediate transfer belt 131 and the backup roll 140 since the non-conductive layer 439 is provided on the rear end side surface 434.

This keeps particles from being attached from the transfer surface of the intermediate transfer belt 131 to the front end side surface 433 and the rear end side surface 434 of the jig 430 by a transfer electric field.

The modification illustrated in FIGS. 9A and 9B is different from the example illustrated in FIGS. 7A and 7B in shapes of the medium 500 and the jig 430.

The medium 500 illustrated in FIGS. 9A and 9B includes a flat plate part 560 having a flat plate shape having a rectangular front surface 561 and a rectangular rear surface 562 and a base part 570 having a rectangular parallelepiped shape protruding from a central part of the rear surface 562 of the flat plate part 560. The flat plate part 560 and the base part 570 are made of a conductor, and the whole medium 500 has electric conductivity. In this example, the front surface 561 of the flat plate part 560 of the medium 500 is the image formation surface including a region where an image is to be formed.

Furthermore, the jig 430 illustrated in FIGS. 9A and 9B has a recessed part 435 that holds the medium 500. In this example, the recessed part 435 has a groove shape extending from one end to the other end of the jig 430 in the width direction. A length of the recessed part 435 along the transport direction is longer than a length of the base part 570 of the medium 500 along the transport direction and is shorter than a length of the flat plate part 560 of the medium 500 along the transport direction. An upper surface 431 of the jig 430 is divided into a front side and a rear side in the transport direction by the recessed part 435. Furthermore, a length of the jig 430 in the transport direction, more specifically, a distance between a front end and a rear end of the upper surface 431 of the jig 430 is longer than a length of the flat plate part 560 of the medium 500 in the transport direction.

The base part 570 of the medium 500 is inserted into a space formed inside the recessed part 435 of the jig 430, and the rear surface 520 of the medium 500 is placed on the upper surface 431 of the jig 430. The upper surface 431 of the jig 430 and the rear surface 520 of the medium 500 make contact with each other, and thereby the jig 430 and the medium 500 become conductive with each other. Accordingly, the front surface 561 of the flat plate part 560 of the medium 500, which is the image formation surface, is connected to ground with the jig 430 and the table part 422 interposed therebetween.

According to the jig 430 illustrated in FIGS. 9A and 9B, a non-conductive layer 439 is provided on a portion of the upper surface 431 that does not make contact with the rear surface 562 of the flat plate part 560.

With this configuration, the intermediate transfer belt 131 makes contact with the non-conductive layer 439 provided on the upper surface 431 of the jig 430 in a case where the attachment table 420 moves to the transfer position in a state where a height of the attachment table 420 has been controlled so that the front surface 561 of the flat plate part 560 of the medium 500 makes contact with the intermediate transfer belt 131 with a strength appropriate for transfer of an image. This keeps the jig 430 from becoming directly conductive with the intermediate transfer belt 131 and the backup roll 140, thereby keeping particles from being attached from the transfer surface of the intermediate transfer belt 131 to the upper surface 431 of the jig 430 by a transfer electric field.

Third Exemplary Embodiment

Next, the third exemplary embodiment of the present disclosure is described. Note that constituent elements similar to those in the first exemplary embodiment are given identical reference signs, and detailed description thereof is omitted.

In the third exemplary embodiment, a jig 430 is kept from becoming directly conductive with an intermediate transfer belt 131 and a backup roll 140 by controlling a timing of application of a voltage to the backup roll 140 by a controller 600 (see FIG. 1).

FIG. 10 is a sequence diagram illustrating an example of a relationship between a timing of control by the controller 600 and a timing at which the medium 500 held by the jig 430 is transported to the transfer position. FIG. 10 illustrates an example of timings during a period for which an attachment table 420 moves from the preparation position to the transfer position and an image is transferred onto a medium 500.

The controller 600 turns on a driving signal of a driving signal that moves the attachment table 420 as illustrated in FIG. 10 after adjusting a height of the attachment table 420 to a transfer execution height at the preparation position. This causes the attachment table 420 to move from the preparation position toward the transfer position along a transport rail 410 (see FIG. 1).

Then, the controller 600 turns on an output signal for applying a transfer voltage to the backup roll 140 (see FIG. 2) at a timing (a timing indicated by (b) in FIG. 10) at which a front end (a front end of a front surface 531) of the medium 500 held by the jig 430 attached to the attachment table 420 reaches the transfer position. As a result, a voltage of a predetermined magnitude is applied to the backup roll 140 by a power source 160, and a transfer electric field is formed between the backup roll 140 and the medium 500.

Then, the controller 600 turns off the output signal for applying the voltage to the backup roll 140 at a timing (a timing indicated by (c) in FIG. 10) at which the medium 500 held by the jig 430 attached to the attachment table 420 passes the transfer position and a rear end (a rear end of the front surface 510) of the medium 500 reaches the transfer position. This ends the application of the voltage to the backup roll 140, and as a result, the transfer electric field is no longer formed between the backup roll 140 and the medium 500.

Then, when the attachment table 420 reaches a fixing unit 200 (see FIG. 1) after passing the transfer position, the controller 600 turns off the driving signal of the driving device that moves the attachment table 420.

In the present exemplary embodiment, as a result of the control performed by the controller 600, a voltage is applied to the backup roll 140 during a period between (b) and (c) in FIG. 10, in other words, during a period for which the medium 500 is passing the transfer position and the front surface 510 of the medium 500 and the intermediate transfer belt 131 are in contact with each other. This makes it possible to transfer an image formed with particles on the intermediate transfer belt 131 onto the front surface 510 of the medium 500 by a transfer electric field formed between the backup roll 140 and the front surface 510 of the medium 500.

Furthermore, in the present exemplary embodiment, as a result of the control performed by the controller 600, no voltage is applied to the backup roll 140 during a period for which the intermediate transfer belt 131 and the front surface 510 of the medium 500 are not in contact with each other.

More specifically, in the present exemplary embodiment, no voltage is applied to the backup roll 140 during a period between (a) and (b) in FIG. 10, in other words, during a period from a timing at which the front end (the front end of the upper surface 431) of the jig 430 attached to the attachment table 420 reaches the transfer position to a timing at which the front end (the front end of the front surface 510) of the medium 500 reaches the transfer position. Furthermore, in the present exemplary embodiment, no voltage is applied to the backup roll 140 during a period between (c) and (d) in FIG. 10, in other words, during a period from a timing at which the rear end (the rear end of the front surface 510) of the medium 500 reaches the transfer position to a timing at which the rear end (the rear end of the upper surface 431) of the jig 430 passes the transfer position.

Furthermore, in the present exemplary embodiment, no voltage is applied to the backup roll 140 during a period for which the intermediate transfer belt 131 and the upper surface 431 of the jig 430 are in contact with each other.

This keeps the upper surface 431 of the jig 430 from becoming directly conductive with the intermediate transfer belt 131 and the backup roll 140, thereby keeping particles from being attached from the transfer surface of the intermediate transfer belt 131 to the upper surface 431 of the jig 430 by a transfer electric field.

Although the exemplary embodiments of the present disclosure have been described, the technical scope of the present disclosure is not limited to the above exemplary embodiments.

For example, although the image forming apparatus 10 forms a transfer electric field between the backup roll 140 and the image formation surface of the medium 500 by connecting the image formation surface of the medium 500 to ground with the jig 430 interposed therebetween and applying a predetermined voltage to the backup roll 140 by the power source 160 in the above exemplary embodiments, this is not restrictive. For example, the image forming apparatus 10 may form a transfer electric field between the backup roll 140 and the image formation surface of the medium 500 by connecting the backup roll 140 to ground and applying a voltage to the jig 430 and the table part 422. In this case, for example, in the third exemplary embodiment, the controller 600 need just control a timing at which a voltage is applied to the jig 430 or the table part 422 instead of a timing at which a voltage is applied to the backup roll 140.

In the present exemplary embodiment, it is desirable that the configuration of the jig 430 attached to the attachment table 420 be simple since the attachment table 420 of the transport mechanism 400 moves along the transport rail 410. In a case where the configuration in which the image formation surface of the medium 500 is connected to ground with the jig 430 interposed therebetween and a predetermined voltage is applied to the backup roll 140 by the power source 160 is employed as in the above exemplary embodiments, it is unnecessary to connect a member such as a power source to the jig 430. This may simplify the configuration of the jig 430 and the configuration of the attachment table 420 to which the jig 430 is attached.

Various changes and substitution of the configurations are encompassed within the present disclosure without departing from the scope of the technical idea of the present disclosure.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))
An image forming apparatus including:
a transport unit that transports a recording medium;
a transfer unit that transfers an image formed with particles onto an image formation surface of the recording medium transported by the transport unit by an electric field formed between the transfer unit and the image formation surface by making contact with the image formation surface; and
a support unit that supports the recording medium, is transported to the transfer unit together with the recording medium by the transport unit, and is not directly conductive with the transfer unit.

(((2)))
The image forming apparatus according to (((1))), wherein:
the support unit does not make contact with the transfer unit.

(((3)))
The image forming apparatus according to (((1))) or (((2))), wherein:
the support unit supports a side surface of the recording medium and has a height lower than a height of the image formation surface of the recording medium.

(((4)))
The image forming apparatus according to (((1))), wherein:
the support unit makes contact with the transfer unit and has, on a portion that makes contact with the transfer unit, a non-conductive layer having lower electric conductivity than the image formation surface of the recording medium.

(((5)))
The image forming apparatus according to (((4))), wherein:
a portion of the support unit that makes contact with the recording medium has electric conductivity, and the support unit is conductive with the image formation surface of the recording medium by making contact with the recording medium.

(((6)))
The image forming apparatus according to any one of (((1))) to (((5))), further including a power source that applies a voltage for forming the electric field,
wherein the power source applies no voltage during a period for which the transfer unit and the image formation surface of the recording medium are not in contact with each other.

(((7)))
The image forming apparatus according to (((6))), wherein:
the support unit makes contact with the transfer unit before the transfer unit and the image formation surface of the recording medium make contact with each other; and
the power source applies no voltage before the transfer unit and the image formation surface of the recording medium make contact with each other.

(((8)))
The image forming apparatus according to any one of (((1))) to (((7))), further including a cleaning unit that cleans the support unit by making contact with the support unit that has passed through the transfer unit.

What is claimed is:
1. An image forming apparatus comprising:
a transport unit that transports a recording medium;
a transfer unit that transfers an image formed with particles onto an image formation surface of the recording medium transported by the transport unit by an electric field formed between the transfer unit and the image formation surface by making contact with the image formation surface;
a support unit that supports the recording medium, is transported to the transfer unit together with the recording medium by the transport unit, and is not directly conductive with the transfer unit; and
a cleaning unit that cleans the support unit by making contact with the support unit that has passed through the transfer unit.
2. The image forming apparatus according to claim 1, wherein:
the support unit does not make contact with the transfer unit.

3. The image forming apparatus according to claim 2, wherein:
the support unit supports a side surface of the recording medium and has a height lower than a height of the image formation surface of the recording medium.

4. The image forming apparatus according to claim 1, wherein:
the support unit makes contact with the transfer unit and has, on a portion that makes contact with the transfer unit, a non-conductive layer having lower electric conductivity than the image formation surface of the recording medium.

5. The image forming apparatus according to claim 4, wherein:
a portion of the support unit that makes contact with the recording medium has electric conductivity, and the support unit is conductive with the image formation surface of the recording medium by making contact with the recording medium.

6. The image forming apparatus according to claim 1, further comprising a power source that applies a voltage for forming the electric field,
wherein the power source applies no voltage during a period for which the transfer unit and the image formation surface of the recording medium are not in contact with each other.

7. The image forming apparatus according to claim 6, wherein:
the support unit makes contact with the transfer unit before the transfer unit and the image formation surface of the recording medium make contact with each other; and
the power source applies no voltage before the transfer unit and the image formation surface of the recording medium make contact with each other.

8. An image forming apparatus comprising:
transport means for transporting a recording medium;
transfer means for transferring an image formed with particles onto an image formation surface of the recording medium transported by the transport means by an electric field formed between the transfer means and the image formation surface by making contact with the image formation surface;
support means for supporting the recording medium, is transported to the transfer means together with the recording medium by the transport means, and is not directly conductive with the transfer means; and
cleaning means that cleans the support means by making contact with the support means that has passed through the transfer means.

* * * * *